United States Patent
Tokisue et al.

(10) Patent No.: US 6,493,188 B1
(45) Date of Patent: Dec. 10, 2002

(54) MAGNETIC DISC APPARATUS HAVING SLIDER WHICH REDUCES VARIATION IN LIFT-UP CAUSED BY CHANGE IN AIR PRESSURE

(75) Inventors: Hiromitsu Tokisue, Chiyoda (JP); Ryuji Tsuchiyama, Matsudo (JP); Masaaki Matsumoto, Fujisawa (JP); Yoshihiko Miyake, Odawara (JP); Kiyoshi Hashimoto, Odawara (JP)

(73) Assignee: Hitachi, Ltd., Toko (JP)

( * ) Notice: Subject to any disclaimer, the term of this patent is extended or adjusted under 35 U.S.C. 154(b) by 0 days.

(21) Appl. No.: 09/558,052

(22) Filed: Apr. 26, 2000

(30) Foreign Application Priority Data

Jan. 18, 2000 (JP) ........................................ 2000-013889

(51) Int. Cl.$^7$ ................................................ G11B 5/60
(52) U.S. Cl. ................................ 360/245.1; 360/235.5; 360/236.3
(58) Field of Search ........................... 360/234.6, 235.5, 360/236.3, 245.1

(56) References Cited

U.S. PATENT DOCUMENTS 5,675,454 A * 10/1997 Hatanai et al. .......... 360/234.6
6,055,128 A * 4/2000 Dorius et al. ............... 360/103
6,144,529 A * 11/2000 Wada et al. ............. 360/236.1
6,157,519 A * 12/2000 Kohira et al. ............... 360/245

FOREIGN PATENT DOCUMENTS

EP       0 736 859 A2    1/1996
JP       5-28682       *  2/1993

* cited by examiner

Primary Examiner—Jefferson Evans
(74) Attorney, Agent, or Firm—Antonelli, Terry, Stout & Kraus, LLP

(57) ABSTRACT

A decrease in the lift-up degree of the outflow end of a slider at an altitude of 3,000 m is set to be less than 2 nm or to be zero in order to set the lift-up degree of the outflow end to be less than 10 nm. There is provided a magnetic disc apparatus in which the action point of positive pressure is shifted toward the inflow end but the action point of negative pressure is shifted toward the outflow end so as to enhance the influence upon the outflow end by the negative pressure in order to effect an action in the increasing direction of the lift-up degree of the outflow end when the pressure is reduced. Further, it is possible to increase the lift-up degree of the outflow end when the pressure is decreased. The action point of the equivalent load is offset from the action point of positive pressure toward the inflow end, and the distance between the action point of the positive pressure and the action point of the equivalent load point is set to be greater than 0.1 times as large as the overall slider length.

4 Claims, 9 Drawing Sheets

MAGNETIC DISC APPARATUS HAVING SLIDER WHICH REDUCES VARIATION IN LIFT-UP CAUSED BY CHANGE IN AIR PRESSURE

BACKGROUND OF THE INVENTION

The present invention relates to a magnetic disc apparatus, and in particular, to a magnetic disc apparatus incorporating a low lift-up slider which can reduce the pressure dependency of the degree of lift-up at the outflow end of the slider.

Japanese Laid-Open Patent No. H5-28682A discloses a conventional magnetic disc apparatus incorporating a head slider having a load fulcrum which is shifted toward the inflow side of the slider in the air-flow direction thereof in order to reduce variation in the degree of the lift-up at the outflow end thereof, which is caused by production unevenness of the head slider, external force during operation, external force given by an air stream or the like, and means for applying a moment around the load fulcrum in order to correct load distribution for a variation which is caused by the shift of the load fulcrum.

In the prior art, since a variation in the load distribution over the slider is compensated for so as to prevent the load from being biased in the air-flow direction of the slider, occurrence of the so-called forward pitching which causes the leading edge, in the air-flow direction, of the slider to continuously rub a magnetic disc, can be restrained even during operation of contact start and stop (which will be hereinbelow simply denoted as ("CCS") even in a conventional start and stop system for the apparatus, thereby it is possible to prevent the slider or the magnetic disc from being damaged by the forward pitching. However, in this arrangement, the resultant force which is composed, perpendicular to the surface of the magnetic disc, of a load and a moment that are exerted to the slider from a suspension acts upon a position in the vicinity of the center point of the slider in the air-flow direction thereof due to the above-mentioned correction for the load distribution, it is required that the resultant force of the aerodynamic forces exerted upon the slider during lift-up acts upon a position in the vicinity of the center point of the slider in the air-flow direction in view of lift-up during lift-up of the slider. That is, in the above-mentioned prior art, it is required to design a shape of a lifting surface of a lifting rail, a lifting pad or the like of the slider in order to allow the resultant force of aerodynamic forces applied to the slider during lift-up thereof to act upon a position in the vicinity of the center point of the slider in the air-flow direction.

With this restrictions, the respective action points of a positive pressure force, that is, a resultant force of positive pressure, a negative pressure force, that is, a resultant force of negative pressure, which are applied to the opposite surfaces of the magnetic disc, and which constitute the resultant forces of the aerodynamic force exerted to the slider, are difficult to optionally set on the opposites surfaces of the slider. Thus, there can be hardly designed the shape of the lifting surface of the slider, which can reduce decrease in the degree of lift-up at the outflow end of the slider due to "lowering of the atmospheric pressure up to an altitude of 3,000 m", which mainly causes variation in the degree of lift-up of the outflow end of the slider, and which causes mostly variation in the degree of lift-up at the outflow end of the slider in the conventional apparatus.

BRIEF SUMMARY OF THE INVENTION

The present invention is devised in order to solve the above-mentioned problems inherent to the prior art so as to reduce a decrease in the degree of lift-up at the outflow end of a slider due to the lowering of the atmospheric pressure up to an altitude of 3,000 m which mostly causes variation in the degree of lift-up at the outflow end of the slider in the conventional devices, to a value less than 10 nm or even to zero, and accordingly, an object of the present invention is to provide a non-contact type lift-up slider having a degree of lift-up which is 10 nm or less at the outflow end thereof, and a contact type slider whose contact force is reduced, and is also to provide a magnetic disc apparatus incorporating any of these sliders.

To the end, according to the present invention, there is provided a magnetic disc apparatus comprising a magnetic disc rotatably mounted to a spindle, a slider having an opposed surface opposed to an outer surface of the magnetic disc, one or more than one of lifting surfaces defined by at least one or a combination of those of a lifting rail, a lifting pad, a taper and a step, for producing a positive pressure force which is a resultant force of a positive pressure exerted to the opposed surface, an inflow end which is a frontmost part of the one or more than one of lifting surfaces in a running direction of the slider, an outflow end which is a rearmost part of the one or more than one of lifting surfaces in the running direction of the slider, a slider center point between the inflow end and the outflow end and an overall slider length which is a distance between the inflow end and the outflow end, and also incorporating a magnetic head for recording and reproducing data to and from the magnetic disc, a suspension supporting the slider, for applying a predetermined urging pressure thereto, and a carriage attached to the suspension, for positioning the slider on the magnetic disc, said slider further having an inverted stepped wall formed in such as to be caved from the inflow end to the outflow end of the slider, and a bleed surface formed in the outflow end side of the inverted stepped wall and caved from the lifting rail or the lifting pad, for producing a negative pressure force which is a resultant force of negative pressure exerted to the opposed surface, wherein said suspension is capable of applying a pitching moment which is substantially greater than the product of a value 0.1 times as large as the overall slider length and an urging load, to the slider around the center point, an equivalent load point which is obtained by dividing the pitching moment with the urging load which is offset from the slider center point in the inverted stepped wall of the slider, toward the inflow end on the opposed surface of the slider opposed to the outer surface of the magnetic disc.

Specifically, the above-mentioned equivalent load point is positioned so as to be shifted from an averaged position of the inverted stepped wall of the slider in the overall length direction of the slider, toward the inflow end, and the distance between the equivalent load point and the action point of the above-mentioned positive pressure force is greater than a value about 0.1 times as large as the overall length of the slider.

More specifically, the above-mentioned equivalent load point is positioned so as to be offset from a position which is taken from the inflow end of the slider toward the outflow end thereof by a distance which is about 0.3 times as large as the overall length of the slider, toward the inflow end.

DETAILED DESCRIPTION OF THE DISCLOSURE

Figure 1:
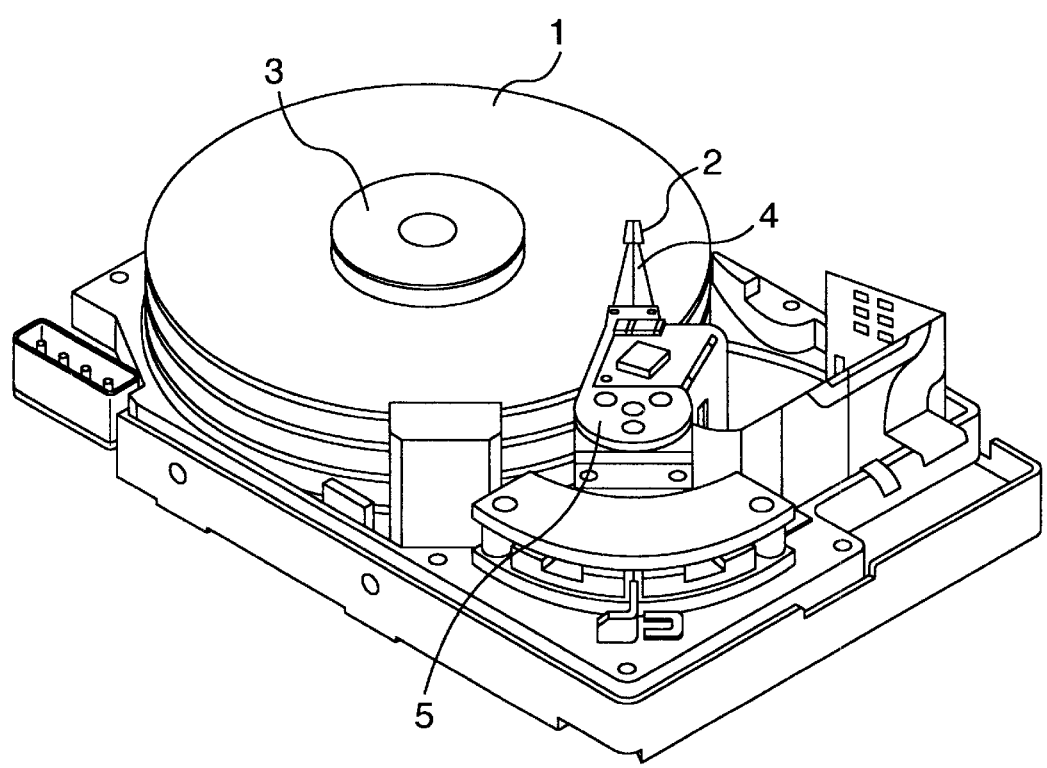
FIG. 1 is a perspective view illustrating a magnetic disc apparatus in an embodiment of the present invention.

Explanation will be made of embodiments of the present invention with reference to the accompanying drawing. Referring to FIG. 1 which is a perspective view illustrating a magnetic disc in a first embodiment of the present invention.

A plurality of magnetic discs 1 on which signals are recorded are stacked on and fixed to a spindle 3, and accordingly, it can be rotated. A slider 2 incorporating a magnetic head for recording and reproducing data is moved over each surface of each magnetic disc 1 in a substantially radial direction of the magnetic disc 1 by means of a carriage 5 through the intermediary of a suspension 4. It is noted that the carriage 5 is adapted to be driven by a voice coil motor 5b.

Figure 2:
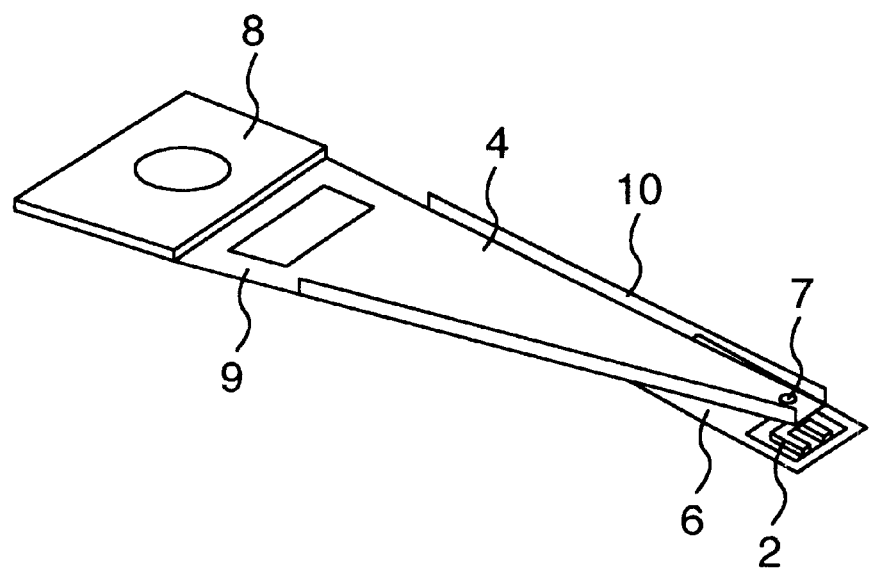
FIG. 2 is a perspective view illustrating an assembly of a slider and a suspension.

Referring to FIG. 2 which is a perspective view illustrating an assembly of the slider 2 and the suspension 4, the suspension 4 is fixed to the carriage 5 by means a mount 8 provided to the suspension 4. The suspension 4 is formed therein with a spring part 9 for applying an urging force to the slider 2. The suspension 4 is formed thereto with flanges 10 for enhancing the stiffness of the suspension, over the entire length thereof, except a part around the spring part 9. Further, the suspension 4 is formed on its front end part side with a pivot protrusion 7 which is projected toward the magnetic disc 1. This pivot protrusion 7 is pressed against the rear surface of the slider 2, that is, the surface of the slider on the side remote from the surface of the slider which is opposed to the magnetic disc 1, and as a result, the suspension 4 can apply the urging force to the slider 2.

Further, the slider 1 is fixed to the suspension 4 by means of gimbals 6 formed of a thin sheet resilient member which is flat, being substantially parallel with the outer surface of the magnetic disc 1 so that the slider 1 can carry out pitching and rolling around a contact point between itself and the pivot protrusion 7 with no substantial restriction, but is substantially fixed to in a direction inward of the surface of the magnetic disc 1.

Figure 3:
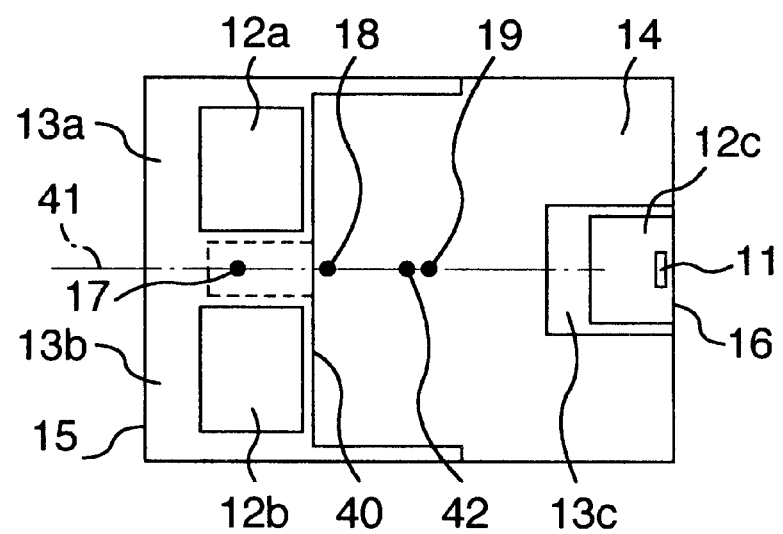
FIG. 3 is a plan view illustrating an opposed surface of the slider shown in FIG. 2, with respect to a magnetic disc.

Referring to FIG. 3 which is a plan view illustrating the opposed surface of the slider 2 with respect to the magnetic disc 1, lifting pads 12a, 12b are provided on the slider 2 on the inflow end 15 side thereof, and a center pad 12c which incorporates a magnetic head 11 is provided on the outflow end 16 side thereof. Stepped parts 13a, 13b, 13c are formed on the inflow end side these lifting pads 12a, 12b and the center pad 12c, respectively, being caved from the pad surfaces by a depth of about several tenth nm. Further, an inverted stepped wall 40 is formed on the outflow end 16 side of the lifting pads 12a, 12b so as to have such a shape that it is caved in a direction from the inflow end 15 toward the outflow end 16. Further, a bleed surface 14 caved from the pad surfaces by a depth of about several hundreds nm is defined by the stepped wall 40 and the center pad 12c. This stepped wall is formed at a position which is taken from the inflow end by a distance which is 0.2 to 0.4 times as large as the overall slider length of the slider 2.

It is noted that the overall slider length is equal to a distance between the inflow end 15 and the outflow end 16 in FIG. 3 which is a plan view. Further, the center point of the overall slider length on the center line 41 of the slider 2 is called as a slider center point 42.

Figure 4:
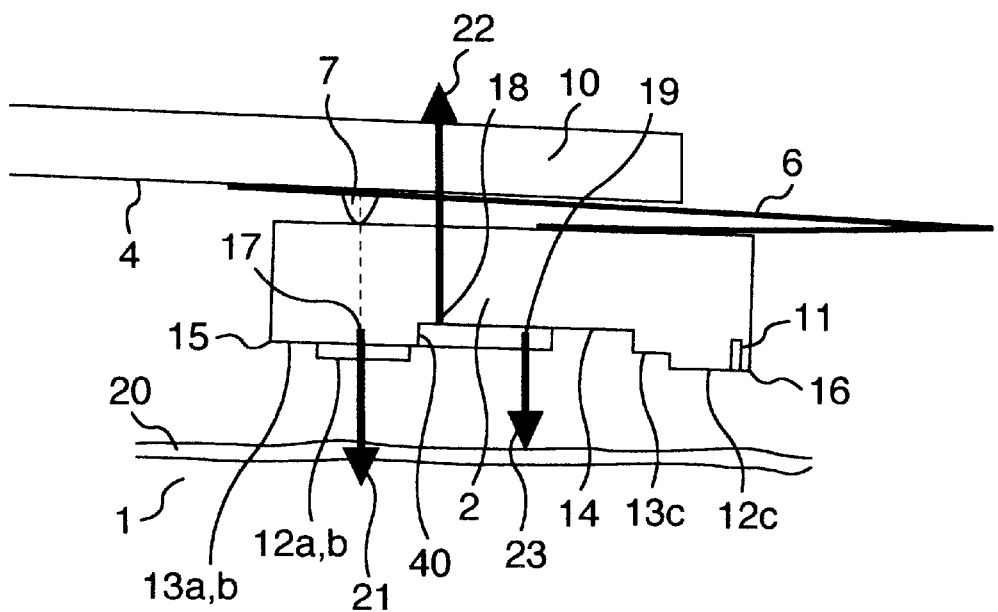
FIG. 4 is a side view illustrating the slider during lift-up, and the magnetic disc.

Referring to FIG. 4 which is a side view illustrating the slider 2 and the magnetic disc 1, that is, a sectional view along the center line 41 shown in FIG. 3, the slider 2 is lifted up from the surface of the magnetic disc through the intermediary of an air film in a substantially noncontact manner, or it runs on the surface of the magnetic disc 1 in such a manner that the center pad 12c of the slider 2 is made into slightly contact with the surface of the magnetic disc 1. In order to prevent both slider 2 and magnetic disc 1 from being worn or damaged when the slider is made into contact with the magnetic disc 1, the surface of the magnetic disc 1 is coated thereover with perfluoropolyether lubricant 20.

It is noted that the suspension 4 which is inclined, is substantially in parallel with the joint surfaces of the gimbals 6 and the sliders 2 in order to allow the opposed surface of the slider 2 with respect to the surface of the magnetic disc 1 to be substantially in parallel with the surface of the magnetic disc 1 in such a case that no lifting force is applied by the air film, as is similar to a normal case of a conventional arrangement. That is, the gimbals are attached so that no force is exerted to the slider 2 through the intermediary of the pivot protrusion formed on the suspension 4 if no lifting force is exerted. Accordingly, even though the position of the pivot protrusion 7 is shifted toward the inflow end of the slider 2 in the air flow direction of the slider 2, no force is effected, and accordingly, no moment is induced at the position of the pivot protrusion. Specifically, it is designed and manufactured that the angle between the joint surface of the gimbals 6 with respect to the suspension 4 and the joint surface thereof with respect to the slider 2 is set to be smaller than about 0.5 deg. that is, about 0.0087 rad. With this arrangement, the pitching stiffness of the gimbals 6 in a direction in which the slider carries out pitching is set to be, for example, about $8 \times 10^{-4}$ Nmm/rad. Meanwhile, the pitching stiffness given by the air film which is produced when the slider 2 is lifted up is about $9 \times 10^{-1}$ Nmm/rad, that is, it is larger than the former by three digit orders. Accordingly, it may be said that substantially no pitching moment is effected to the slider 2 upon lift-up by the gimbals 6.

It is noted that the position of the pivot protrusion 7 is set so as to have a distance which is 0.1 to 0.7 times as large as the overall slider length, measured from the inflow end of the slider. A most preferable position thereof has a distance which is 0.2 times as large as the overall slider length from the inflow end of the slider.

As shown in FIGS. 3 and 4, the urging load 21 is exerted by the suspension 4 onto the slider at the urging load point 17 through the pivot protrusion 7. Further, in this embodiment, as usually conducted, the postures of the suspension and the gimbals 6 are adjusted so as to prevent the suspension 4 from applying a moment upon the slider 2 in a condition in which the slider 4 is lifted up above the magnetic disc 1. That is, since no moment is applied to the slider 2 around the pivot protrusion 7 by the suspension 4, an equivalent urging load which is the resultant force, perpendicular to the surface of the magnetic disc 1, of a force and a moment which are applied to the slider 2 by the suspension 4 merely becomes the urging load 21. The equivalent load point which is an action point at which the equivalent urging load is applied to the slider 2 is identical with the load urging point 17. Further, this urging load point 17 or the equivalent load point is located offset from the inverted stepped wall 40 toward the inflow end 15.

In this arrangement according to the present invention, the slider may be supported so as to prevent the slider from forward pitching when a lift-up force is exerted thereto, but there would be a such a risk that the disc and the slider bump upon each other so as to be damaged if an external force is exerted thereto when no lift-up force is applied, since a spring constant or the like of the gimbals 6 is small although the slider is supported so as to be held in substantial parallel with the magnetic disc, as mentioned above. Thus, the present invention can be applied to a magnetic disc apparatus of a type in which the slider can be rested on a ramp part which is not shown, in such a condition that no lift-up force is exerted, that is, a load/unload type magnetic disc apparatus.

Further, in this embodiment, a positive pressure force 22 which is the resultant force of positive pressure which is higher than the atmospheric pressure and which is produced on the opposed surface of the slider 2 with respect to the magnetic disc 1, is exerted to the positive pressure action point 18. Further, a negative pressure force 23 which is the resultant force of negative pressure lower than the atmospheric pressure is exerted to a negative pressure action point 19. The urging load point 17 and the equivalent load point are offset from the positive pressure action point 18 toward the inflow end 15, and the distance between the urging load point 17 and the positive pressure action point 18 is 0.1 times as large as the overall slider length, that is, the distance between the inflow end 15 and the outflow end 16 of the slider 2. Specifically, in this embodiment, the urging force is about $0.3 \times 10^{-3}$ N and the positive pressure force is about $0.6 \times 10^{-3}$ N.

Further, in this embodiment, the urging load point 17 or the equivalent load point is located offset from a position having a distance which is about 0.3 times as large as the overall slider length, and which is taken from the inflow end 15 toward the outflow end 16 of the slider 2, toward the inflow end 15.

Further, as to the plan shape of the opposed surface of the slider 2 with respect to the magnetic disc, a stepped wall shape as indicated by the dot line in FIG. 3, that is, a cave 44 having a bottom wall surface 43 between inverted stepped walls 40a, 40b may be formed. In this case, as to the position of the inverted stepped wall, it may be a line connecting between the inverted stepped walls 40a, 40b. In this embodiment, the urging load point 17 or the equivalent load point is located at a position which is offset from the line connecting between the inverted stepped walls 40a, 40b toward the inflow end 15.

It is noted that the pressure applied to the opposed surface of the slider with respect to the magnetic disc 1, according to the present invention, the positive pressure force 22, the positive pressure action point 18, the negative pressure force 23 and the negative pressure action point 19 can be obtained by a method which will be hereinbelow explained:

At first, a method of obtaining the pressure applied to the opposed surface will be explained below:

In the first method, a shape of the opposed surface of the slider 2 with respect to the magnetic disc 1, an urging load and a moment which are exerted to the slider 2 by the suspension 4, and an action point thereof are measured, and then, a pressure distribution in a gap is obtained by numerical simulation. It is possible to estimate that the shape of the outer surface of the magnetic disc is usually planar.

First, as to the measurement of the shape of the opposed surface of the slider 2 with respect to the magnetic disc 1, in a plan view and a elevation view, the plan view shape of the opposed surface, as shown in FIG. 3, is usually measured with the use of a length measuring microscope, for example, a SIGMET microscope manufactured by UNION OPTICS Co. Further, as shown in FIG. 4, heights and depths of stepped parts or grooves are measured with the use of a surface shape measuring technique using a non-contact type three-dimensional shape measuring device using a phase shift interference process, for example, NewView 200 made by ZYCO Co., having a resolution with nanometer order in the heightwise direction.

For example, the dimensions of the shape of the opposed surface of the slider with respect to the magnetic disc, indicated by the dotted line in FIG. 3 are in part shown as follows:

Overall slide length: 1.25 mm

Slider width: 1.0 mm

It is noted that the slider width as mentioned above exhibits an external shape size of the slider in the direction orthogonal to the overall slider length.

Stepped height: 150 nm

It is noted that the stepped height is a difference in height between the lifting pads 12a, 12b or the center pad 12c and the stepped parts 13a, 13b, 13c.

Bleed depth: 1 $\mu$m

It is noted that the bleed depth is a difference in height between the lifting pads 12a, 12b, the center pad 12c and the bleed surface 14.

With the use of a numerical simulation program for a stream in a lifting gap, for example, "CML Air Bearing Design Program" issued by CML (Computer Mechanical Laboratory) Berkeley college in California University, which is exclusively used for sliders in magnetic disc apparatus, a pressure distribution in the lift gap is obtained from the shape of the opposed surface of the slider 2, the urging load and the moment and the action point thereof which are obtained as mentioned above. The above-mentioned "CML Air Bearing Design Program" has been substantially used as a standard slider lift analysis program in the technical field of magnetic discs, and with the use of this program, common results can be obtained for lifting characteristics of sliders in this technical field. Some makers who do not used this program, have used a lift analysis program prepared by themselves. Difference among results obtained by these program is very small, that is, less than about several nm. Thus, it may be safely said that substantially common pressure distributions can be obtained even though any of these different programs is used.

The above-mentioned "CML Air Bearing Design Program" or the like uses, as a technique for numerically analyzing an air stream in the lifting gap having nanometer order, a process of solving a molecular gas lubrication equation delivered from the Boltzmann equation which can be simplified by estimation such that the configuration of the gap is moderately changed in the flow direction. With this process, it has been confirmed that a pressure distribution with a high degree of accuracy can be obtained even though the lift-up degree of the inflow end is very small, that is, 2 nm if the degree of surface roughness of the slider 2 of the magnetic disc 1 is negligibly small in comparison with the lift-up degree of the outflow end.

Next, a second process is adapted to obtain a pressure distribution in the gap with the use of the above-mentioned numerical simulation by obtaining, through measurement, a distribution of the lifting gap of the slider 2 in a direction along the surface of the magnetic disc. Similar to the first process, estimation may be made such that the surface configuration of the magnetic disc 1 is planar.

First, in the procedure of measuring a pressure distribution in the lifting gap, a configuration of the opposed surface of the slider 2 with respect to the magnetic disc 1 is obtained, similar to the first process. Next, lift-up degrees at arbitrary three points on the opposed surface of the slider 2 with respect to the magnetic disc 1, for example, the lifting pads 12a, 12b and the center pad 12c are measured with the use of a slider lift-up degree measuring equipment, the so-called lift-up tester such as DFHT made of Phase Metrics Co., and with the lift-up degrees at the three points on the opposed surface of the slider and the configuration of the opposed surface thereof, a distribution of the lifting gap can be known.

The pressure distribution in the lifting gap can be known with the use of the numerical simulation program for a stream in the lifting gap from the distribution of the lifting gap obtained as mentioned above.

Figure 5A:
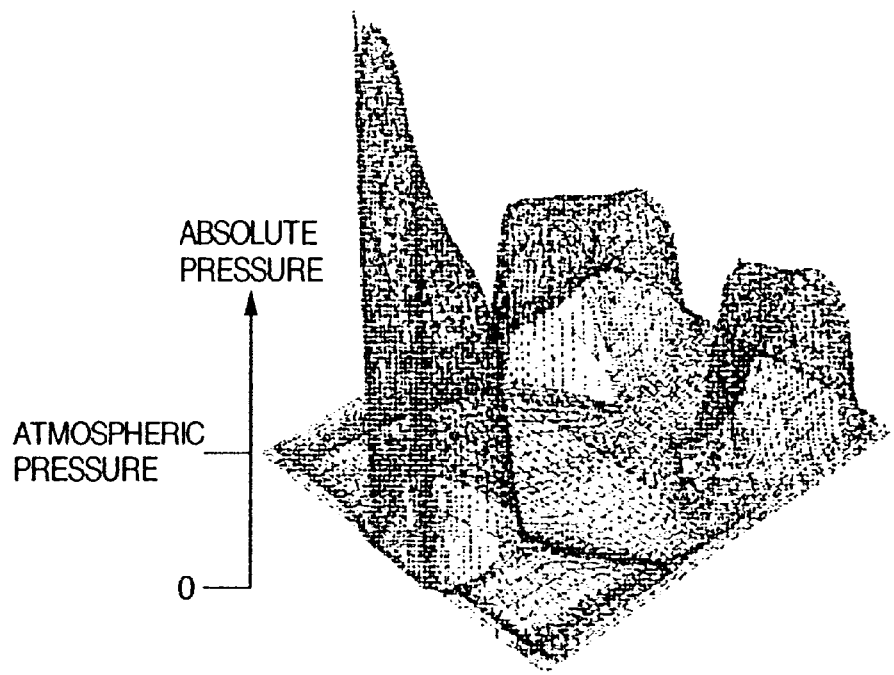
FIG. 5(a) is a view showing a result of numerical simulation as to pressure produced on the opposed surface of the slider with respect to the magnetic disc.
Figure 5B:
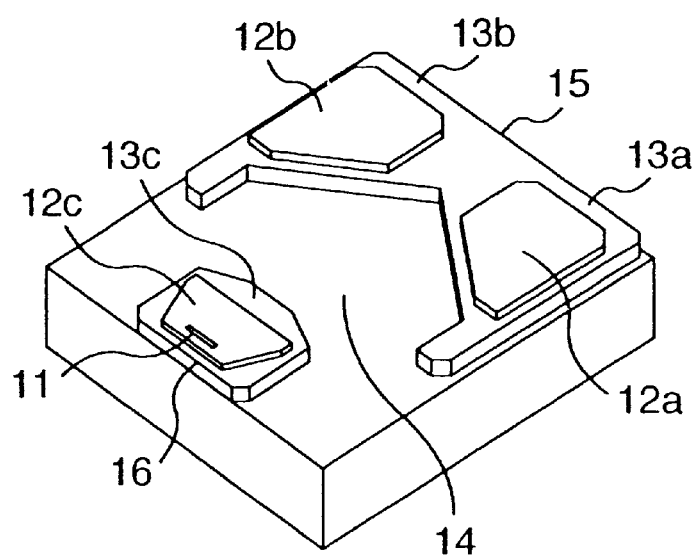
FIG. 5(b) is a perspective view illustrating a slider used in calculation for the simulation shown in FIG. 5(a)

FIG. 5(a) shows results of obtaining pressures induced on the opposed surface of the slider 2 with respect to the magnetic disc 1 through the numerical simulation for solving the above-mentioned molecular gas lubrication equation, corresponding to the opposed surface of the slider 2 with respect to the magnetic disc 1, as shown in FIG. 5(b). In addition to the configuration and the dimensions of the opposed surface of the slider 2 with respect to the magnetic disc 1 shown in FIG. 5(b), an urging force and a moment exerted to the slider 2 by the suspension 4, and the action points thereof, a radial position of the magnetic disc 1 at which the slider runs, a rotational speed of the magnetic disc, an atmospheric pressure and an atmospheric temperature are required for carrying out the numerical simulation. The following is exemplified in this embodiment:

Terms for Computation Urging load: about 3 gf;
Urging load point: a position taken by a distance which is 0.2 times as large as the overall slider length, from the inflow end 15 toward the outflow end 16;
Moment: none:
Radial position: the innermost periphery of a 2.5-inch size magnetic disc;
Rotational Speed: 4,200 rpm:
Atmospheric Pressure: 1 atm.; and
Atmospheric Temperature: 25 deg. C.

From the thus obtained pressure distribution, a position pressure force 22 which is a resultant force of a difference between a pressure higher than the atmospheric pressure and the latter, that is, $F_p$, and the action point 18 of the positive pressure force 22, that is, $X_p$ can be obtained with the use of, for example, the following formulae, Eq. (1) and Eq (2):

$$F_p = \int_A (P-P_a) dA \quad (1)$$

$$X_P = \int_A X(P-P_a) dA / F_p \quad (2)$$

where x: Plane coordinates vector which is taken substantially in parallel with the surface of the magnetic disc 1;
$X_P$: Action point vector of positive pressure force on x plane coordinates:
p: Pressure;
$P_a$: Atmospheric pressure; and
A: Zone in the opposed surface of the slider 2 with respect to the magnetic disc 1, where the pressure p higher than the atmospheric pressure $P_a$ is effected, in the x plane coordinates.

Further, a negative pressure force 23, that is, $F_N$, and an action point 19 of the negative pressure force 23, that is, XN, can be obtained with the use of, for example, the following formulae Eq. (3) and Eq. (4):

$$FN = \int_B (p-p_a) dB \quad (3)$$

$$X_N = \int_N X(P-P_a) dB / F_N \quad (4)$$

where x: Plane coordinates vector which is taken substantially in parallel with the surface of the magnetic disc 1;
$X_N$: Action point vector of negative pressure force on x plane coordinates:
p: Pressure;
$P_a$: Atmospheric pressure; and
B: Zone in the opposed surface of the slider 2 with respect to the magnetic disc 1, where the pressure p lower than the atmospheric pressure $P_a$ is effected, in the x plane coordinates.

Next, technical effects of this embodiments will be explained.

At first, explanation will be made of problems inherent to prior art, that is, those caused by the decrease in the lift-up degree of the outflow end due to lowering of the atmospheric pressure up to an altitude of 3,000 m, is set to 0 to 10 nm.

Figure 6:
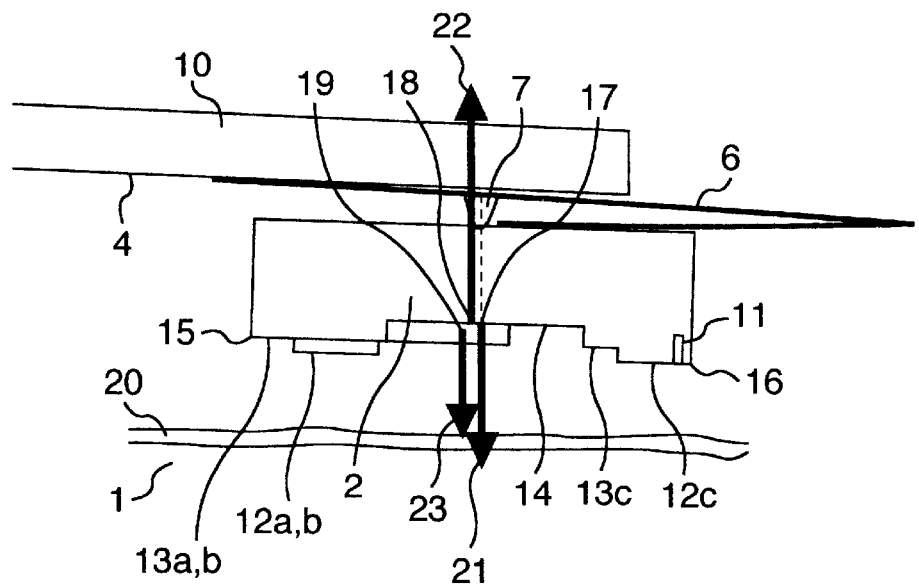
FIG. 6 is a side view illustrating a conventional slider and a magnetic disc.

Referring to FIG. 6 which is a side view illustrating a conventional slider, the urging load point 17 is coincident with the equivalent load point since no moment is exerted around the urging load point 17, and the urging load point 17 is present, being offset from the inverted stepped wall 40 of the slider 2 toward the outflow end. The three points, that is, the urging load point 17, the action point 18 of the positive pressure force and the action point 19 of the negative pressure force are present substantially at one and the same position in the vicinity of the center point of the slider 2.

The sum of the urging load 21 and the negative pressure force 23 now balances with the positive pressure force 22, that is, they are equal to each other. In this condition, if the atmospheric pressure is lowered, the negative pressure 23 and the positive pressure 22 are decreased by a substantially equal rate while the urging load is held to be constant, and accordingly, the degree of decrease is greater in the positive pressure force 22 than in the sum of the urging load 21 and the negative pressure force 23. Since the decrease of the positive pressure force 22 which lifts up the slider 2, is greater, it is inevitable to decrease the lift-up degree of the outflow end of the slider 2 if the atmospheric pressure lowers. As mentioned above, in the apparatus in which the lift-up degree of the outflow end is 20 nm, the decrease in the lift-up degree of the outflow end due to the lowering of the atmospheric pressure up to an altitude of 3,000 m is 6 nm.

On the contrary, in this embodiment, the urging load point 17 is present being offset from an averaged position of the inverted stepped wall 40 of the slider 2 in the direction of the overall slider length toward the inflow end 15. At this time, the negative pressure force point 19 is located on the bleed surface 14 defined on the outflow end 16 side of the inverted stepped wall 40, and accordingly, the action point 19 of the negative pressure force is naturally present being offset from the averaged position 41 of the inverted stepped wall 40 in the direction of the overall slider length, toward the outflow end 16. In view of the force balance, since the action point 18 of the positive pressure force is present between the urging load point 17 and the action point 19 of the negative pressure force, the action point 19 of the negative pressure force is located being offset from the action point 18 of the positive pressure force toward the outflow end 16.

As indicated by the dotted line 3, even though a cave 44 having a bottom wall surface 43 is formed in the inverted stepped wall, the negative pressure action point 19 is located being offset from the line connecting the inverted stepped walls 40a, 40b toward the outflow end 16, similar to that mentioned above, due to the following reasons. That is, as a first reason, the area of the cave 44 is small in comparison with that of the bleed surface 14 formed in the outflow end 16 side of the inverted stepped walls 40a, 40b, and accordingly, even though equal negative pressure is effected on both bleed surface 44 and the cave 44, the action point 19 of the negative pressure corresponding to the action point of the resultant force of the negative pressure effected on both surfaces, is located on the bleed surface 44 having a wider area. As a second reason, a fluid resistance effected on the inflow end 15 side of the bottom wall surface 41, that is, in the case 44, is small in comparison with a fluid resistance effected on the inflow end 15 side of the inverted stepped walls 40a, 40b, and accordingly, a negative pressure effected on the outflow end 16 side of the bottom wall surface 41, that is, in the cave 44 is low in comparison with a negative pressure effected on the outflow end 16 side of inverted stepped walls 40a, 40b. Since the urging load point 17 is present being offset from the line connecting between the inverted stepped walls 40a, 40b toward the inflow end 15 while the action point 19 of the negative pressure is located being offset from the line connecting between the inverted stepped walls 40a, 40b toward the outflow end 16, even in the case indicated by the dotted line in FIG. 3, the action point 19 of the negative pressure is located being offset from the action point 18 of the-positive pressure toward the outflow end 16 side.

Further, in this embodiment, the urging load point 17 is located being offset from the action point 18 of the positive pressure force toward the inflow end 15, and the distance between the urging load point 17 and the action point 18 of the positive pressure force is larger than the value which is about 0.1 times as large as the overall slider length, that is, the distance between the inflow end 15 and the outflow end 16. Accordingly, the action point 19 of the negative pressure force is located inevitably being offset from the action point 18 of the positive pressure force toward the outflow end 16 in order to balance with the urging load 21 and the positive pressure force 22.

In any of the above-mentioned cases, the action point 18 of the positive pressure force goes away from the outflow end 16 and on the contrary, the action point 19 of the negative pressure force comes toward the outflow end 16. With this arrangement, the influence caused by a decrease in the absolute value of the negative pressure force 23 can be reduced while the influence caused by a decrease in the negative pressure force is enhanced. Since the decrease in the absolute value of the negative pressure force 23 is effected in the direction in which the slider 2 is lifted up, it is possible to prevent the lift-up degree of the outflow end 16, that is, the gap between the outflow end 16 and the magnetic disc, from being decreased even though the atmospheric pressure is lowered. Further, by adjusting the distance between the action point 18 of the positive pressure force and the action point 19 of the negative pressure force, or by adjusting the distance between the equivalent load point, that is, the urging load point 17 in this case, and the action point 18 of the positive pressure force, it is theoretically possible to reduce the decrease in the lift-up degree of the outflow end due to lowering of the atmospheric pressure up to an altitude of 3,000 m, down to substantially zero.

Figure 7:
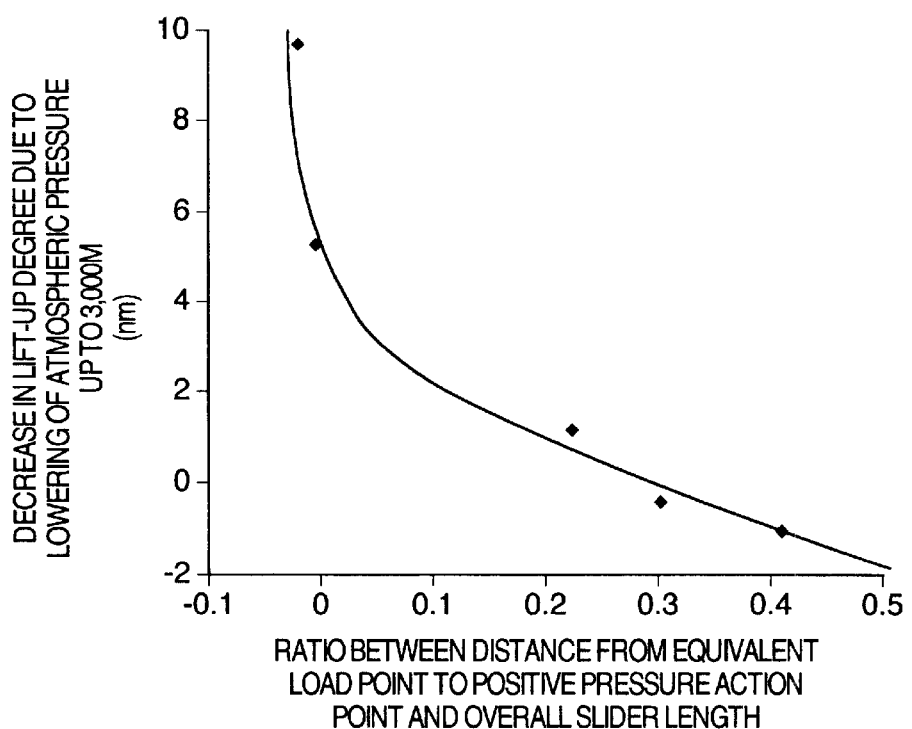
FIG. 7 is a characteristic view showing lowering of the degree of lift-up due to lowering of the atmospheric pressure.

In order to quantitatively consider this technical effect, the urging force point was displaced in the computation shown in FIG. 5, the decrease in the lift-up degree of the outflow end 15 due to the lowering of the atmospheric pressure up to an altitude of 3,000 m with respect to the distance between the equivalent load point and the action point 18 of the positive pressure force was obtained by computation. The results of the computation is shown in FIG. 7. As understood from FIG. 7, in this embodiment, since the distance between the urging load point 17 which is coincident with the action point of the equivalent urging load, and the action point 18 of the positive pressure force is greater than about 0.1 times as large as the overall slider length, the decrease in the lift-up degree of the outflow end due to the lowering of the atmospheric pressure up to an altitude of 3,000 m becomes less than about 2 nm.

As mentioned above, in this embodiment, since the decrease in the lift-up degree of the outflow end due to the lowering of the atmospheric pressure up to an altitude of 3,000 m can be reduced to a value from 2 nm to zero, it is possible to provide a noncontact type lift-up slider in a lower lift-up degree range below 10 nm of a lift-up degree of the outflow end or a contact slider having a reduced contact force, and a magnetic disc apparatus mounted thereon with such a slider.

It is noted that the decrease in the lift-up degree of the outflow end due to the lowering of the atmospheric pressure up to an altitude of 3,000 m becomes zero if the distance between the urging load point 17 and the action point 18 of the positive pressure force is about 0.3 times as large as the overall slider length, and the absolute value thereof becomes less than 1 nm in a range of 0.2 to 0.4 times as large as the overall slider length around the above-mentioned distance. Should the distance become larger than 0.5 times as large as the overall slide length, it would be considered that the decrease in the lift-up degree of the outflow end due to the lowering of the atmospheric pressure up to an altitude of 3,000 m becomes greater than 2 nm, that is, the lift-up degree is increased. That is, the distance between the equivalent load point and the action point 18 of the positive pressure force may be set to be in a range from 0.1 to 0.5 times as large as the overall slider length, and desirably in a range from 0.2 to 0.4 times as large as the overall slider length.

Further, with this arrangement, under a design by the inventors, it has been found that the distance between the equivalent load point and the action point 18 of the positive pressure force can be simply set to be larger than 0.1 times as larger as the overall slider length if the equivalent load point is set to be offset toward the inflow end 15 from a position having a distance of 0.3 times as large as the overall slider length from the inflow end 15 toward the outflow end 16. On the contrary, since the distance between the equivalent load point and the action point 18 of the positive pressure force should be less than 0.5 times as large as the overall slider length, it is unnecessary to locate the equivalent load forward from a position which is taken forward and outward of the slider by a distance 0.5 times as large as the overall slider length. That is, although it is not absolutely inevitable, it is desirable in view of designing the slider to set the equivalent load point between a position which is taken from the inflow end 15 by a distance of 0.3 times as large as the overall slider length toward the outflow end 16, and a position which is taken forward and outward of the slider from the inflow end 15 by a distance of 0.5 times as large as the overall slider length toward the outflow end 16.

Figure 8:
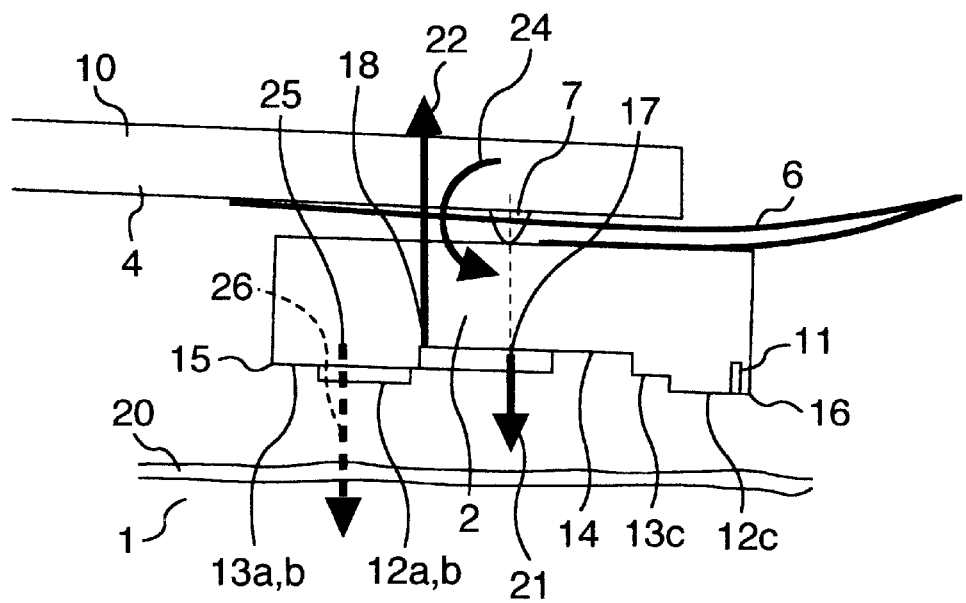
FIG. 8 is a side view illustrating a slider and a magnetic disc in another embodiment of the present invention.
Figure 9:
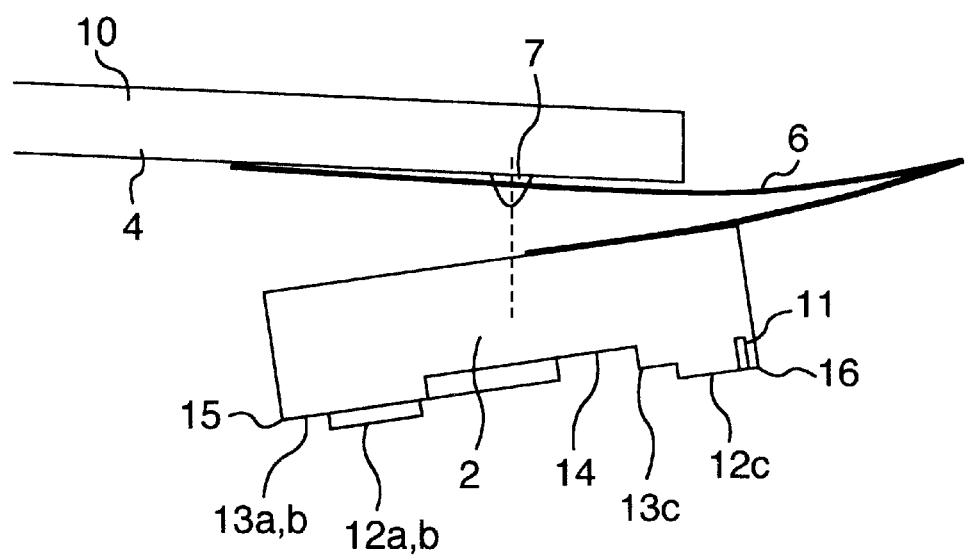
FIG. 9 is a side view illustrating the slider shown in FIG. 8 in a condition in which no lifting force is exerted thereto.

Next, explanation will be made of another embodiment of the present invention with reference to FIGS. 8 and 9 which are side view illustrating a slider 2 and a magnetic disc 1 in this embodiment, that is, FIG. 8 shows a condition in which a lifting force by an air-film is effected so as to cause the slider 2 to be lifted up, and FIG. 9 shows a condition in which the lifting force by the air-film is not effected.

In this embodiment, as shown in the figures, the gimbals 6 are provided being projected from the outflow end side of the slider 2, and in a condition in which no lifting force is effected, the slider 2 is supported by the gimbals 6 on the inflow end side. With this arrangement, the urging load point 17 is set at a position which is a substantially center point of the slider, that is, a position which is about the middle of the overall slider length. An initially set inclined angle is given so as to effect a pitching moment 24 in a direction in which the inflow end 15 of the slider 2 is depressed toward the magnetic disc 1, around the center point of the slider. An equivalent load point 25 which is the action point of an equivalent load 26, that is, the resultant force, perpendicular to the surface of the magnetic disc 1, between the urging point and the pitching moment 24 around the center point of the slider, is present being offset from the inverted stepped wall 40 toward the inflow end. The equivalent load point 25 is present being offset from the action point 18 of the positive pressure force toward the inflow end 15, and the distance between the equivalent load point 25 and the action point 18 of the positive pressure force is greater than about 0.1 times as large as the overall slider length. Further, the equivalent load point 25 is located at a position which is taken from the inflow end 15 of the slider 2 by a distance about 0.3 times as large as the overall slider length toward the outflow end 16. Although it has been explained in this embodiment that the pitching moment 23 is exerted to the slider 2 by the initial set inclined angle of the gimbals, it is of course possible to exert the pitching moment by an initial inclined angle of the suspension 4.

In this embodiment, since the urging load point 17 is located around the gravitational center of the slider 2, it is possible to eliminate the following problem, that is, the slider carries out yawing motion around the urging load point 17 when seek motion of the suspension 4 is carried out radially of the magnetic disc 1 by the carriage 5, and accordingly, the magnetic head 11 is oscillated radially of the magnetic disc 1, resulting in deterioration of the seek positioning function.

Figure 10:
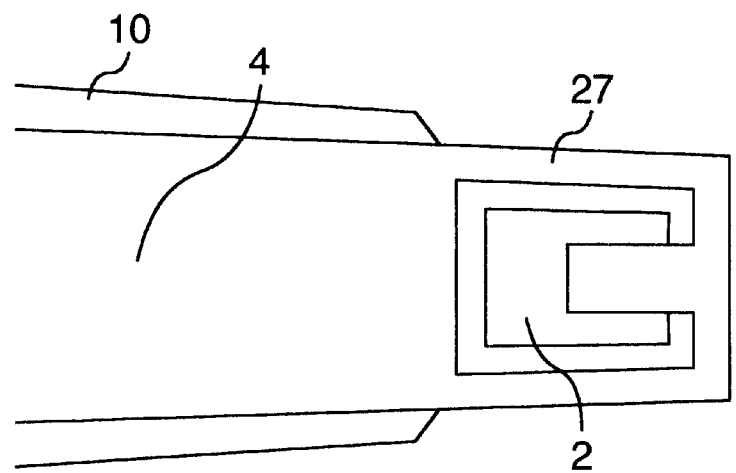
FIG. 10 is a plan view illustrating a part of an assembly of a slider and a suspension in further another embodiment of the present invention.
Figure 11:
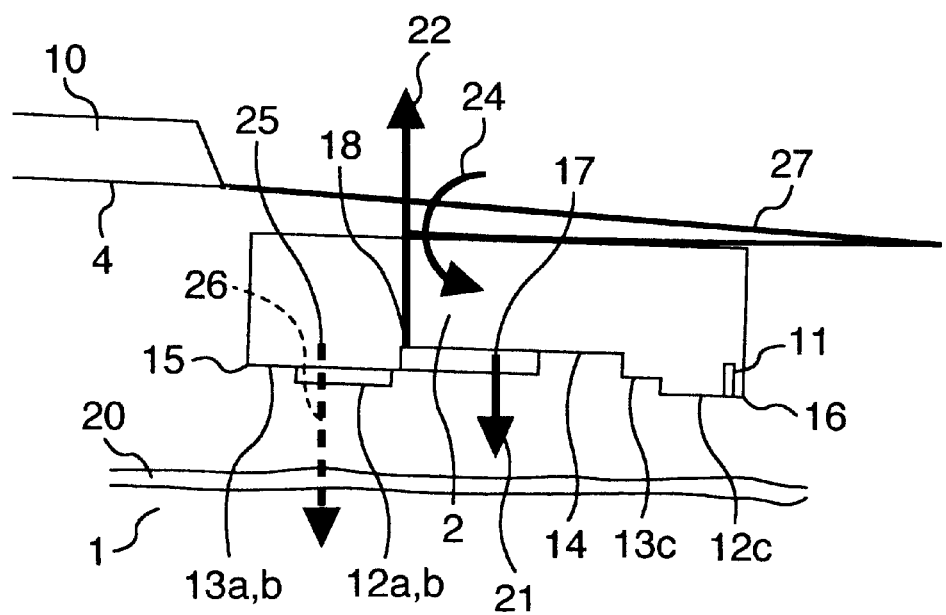
FIG. 11 is a side view illustrating the slide and the magnetic disc shown in FIG. 10, in a condition in which the slider is lifted up.

Next explanation will be made of a further embodiment with reference to FIGS. 10 and 11 among which FIG. 10 is a plan view illustrating a part of the assembly of a slider 2 and a suspension in the further embodiment of the present invention, and FIG. 11 is a side view illustrating the slider 2 and the magnetic disc 1 in the embodiment shown in FIG. 10.

In this embodiment, no pivot protrusion is provided on the suspension 4. Further, the front end part of the suspension 4 also serves as gimbals. That is, a gimbals part 27 is integrally incorporated with the suspension 4, and accordingly, the urging load 21 and the pitching moment 24 are exerted to the slider 2. An equivalent load point 25 which is the action point of an equivalent load 26, that is, the resultant force, perpendicular to the surface of the magnetic disc 1, between the urging point and the pitching moment 24, is present being offset from the inverted stepped wall 40 toward the inflow end. Further, the equivalent load point 25 is present being offset from the action point 18 of the positive pressure force toward the inflow end 15, the distance between the equivalent load point 25 and the action point 18 of the positive pressure force is greater than about 0.1 times as large as the overall slider length. Further, the equivalent load point 25 is located being off from a position which is taken from the inflow end 15 of the slider 2 by a distance about 0.3 times as large as the overall slider length toward the outflow end 16, toward the inflow end 15.

In this embodiment, since no pivot protrusion is present, even though a large force in a seek direction is effected, it is possible to eliminate such a problem that relative displacement exists between the pivot protrusion and the slider 2 due to a frictional force between the pivot point and the slider 2 so as to cause the slider 2 to positionally deviate, relative to the suspension 4, resulting in deterioration of the seek positioning function.

Figure 12:
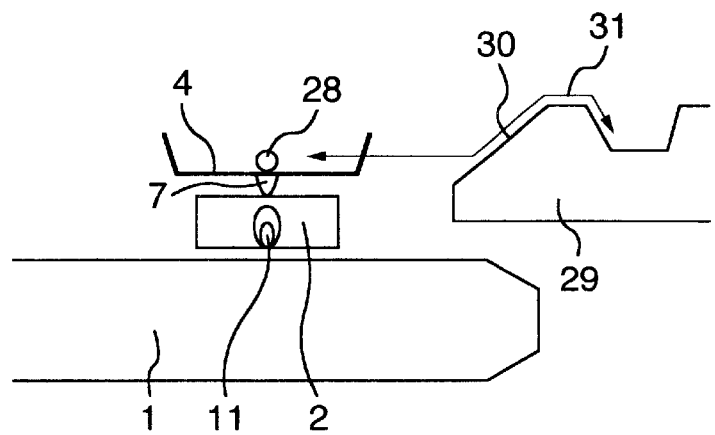
FIG. 12 is a side view showing conditions upon loading/unloading in a further embodiment of the present invention.
Figure 13:
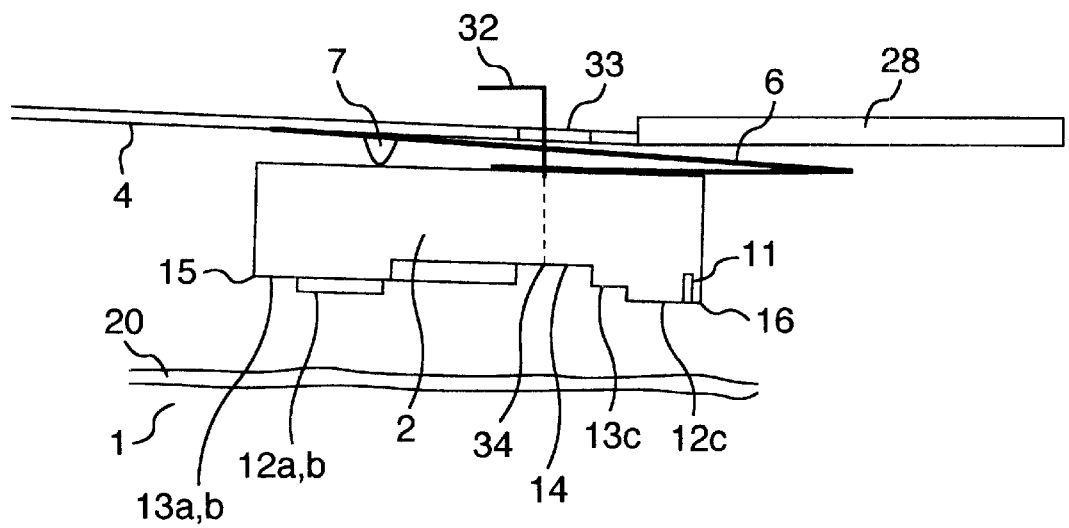
FIG. 13 is a side view illustrating the slider and the magnetic disc shown in FIG. 11 in a condition in which the slider is lifted up.
Figure 14:
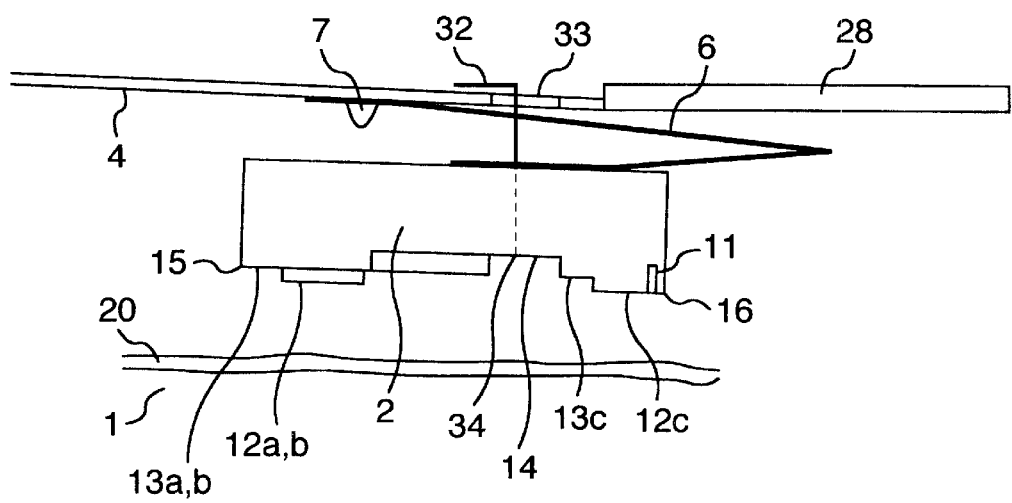
FIG. 14 is a side view illustrating a slider and a magnetic disc in another embodiment of the present invention, in a condition in which the slider is unloaded.

Next, explanation will be made of a fourth embodiment of the present invention with reference to FIGS. 12 to 14 among which FIG. 12 is a side view illustrating a mechanism for loading and unloading a slider 2 onto and from the magnetic disc 1 in this embodiment, and FIGS. 13 and 14 are side views illustrating the slider 2 and the magnetic disc 1 in the embodiment shown in FIG. 12.

In order to promote the decreasing of the lift-up degree, it is necessary to reduce the surface roughness of the magnetic disc 1. As to a slider starting and stopping system, instead of a CCS (Contact Start and Stop) which can hardly be employed due to a high sticking force between the flat magnetic disc and the slider 2, these years, a load and unload mechanism has been used more and more prosperously. In the load and unload mechanism in this embodiment, a tab 28 provided to the suspension 4 is adapted to come up onto an inclined surface 30 of a ramp 29 provided in the vicinity of the outer peripheral edge of the magnetic disc 1 so as to load or unload the slider onto or from the magnetic disc 1. Further, at this time, in order to surely separate the slider on which a negative pressure is effected, from the magnetic disc 1, a hook 32 is provided on the rear surface of the slider 2. The hook 32 is usually formed from a member which is integrally incorporated with the gimbals 6. However, it may be directly provided to the slider 2 as a separate member. The hook 32 is extended to the upper surface of the suspension 4, passing through an aperture formed in the suspension 4, and accordingly, as shown in FIG. 4, when the tab 28 is raised by the ramp 29, the hook 32 is caught on the upper surface of the suspension 4 so as to raise the slider 2. Further, in this embodiment, the action point of a raising force given by the hook 32, that is, an action point 34, is located between a position which is taken from the inflow end 15 of the slider 2 by a distance which is about 0.5 times as large as the overall slider length toward the outflow end 16, and the outflow end 16.

According to this embodiment, even though the action point 19 of the negative pressure force is present in the vicinity of the outflow end 16, since the action point 34 of the raising force by the hook 32 can be also set in the vicinity of the outflow end 16, the slider 2 can be raised substantially in a horizontal posture so as to prevent the slider 2 from making contact with the magnetic disc 1 when the slider 2 is unloaded from the magnetic disc 2, and accordingly, in a magnetic disc apparatus using the load and unload mechanism, it is possible to prevent the slider 2 and the magnetic disc 1 from being worn or damaged.

As clearly understood from the above-mentioned explanation, according to the present invention, the decreasing of the lift-up degree of the outflow end due to the lowering of the atmospheric pressure up to an altitude of 3,000 m, which causes the lift-up degree of the outflow end in the conventional apparatus to vary by a large degree can be decreased to a value which is not only less than 2 nm but also about zero. Accordingly, it is possible to provide a noncontact type lift-up slider in a lower lift-up degree range below 10 rim of a lift-up degree of the outflow end or a contact slider having a reduced contact force, and a magnetic disc apparatus mounted thereon with such a slider.

What is claimed is:

1. A magnetic disc apparatus comprising a magnetic disc having a surface and rotatably mounted on a spindle, a slider incorporating lifting rails or lifting pads opposed to the surface of the magnetic disc, for inducing a positive pressure, and a magnetic head provided to a lifting rail or a lifting pad on the outflow end side, for recording and reproducing data to and from said magnetic disc, a suspension supporting the slider, for applying a predetermined urging force to the slider, and a carriage attached to said suspension, for positioning said slider on the magnetic disc, said slider having an inverted stepped wall formed in a shape such that it is caved in a direction from the inflow end to the outflow end of the slider, and a bleed surface formed at the outerflow end side of the inverted stepped wall and caved from the lifting rails or the lifting pads, for producing a negative pressure force which is the resultant force of negative pressure applied upon an opposed surface of the slider with respect to the magnetic disc, an action point of an equivalent load which is a resultant force, perpendicular to the surface of the magnetic disc, between a force and a pitching moment exerted to the slider by the suspension, on the slider, which is an equivalent load point is located offset from the inverted stepped wall of said slider toward the inflow end of said slider, wherein the opposed surface or the slider with respect to the magnetic disc, has an action point of a force of said positive pressure, and an action point of the negative pressure force, and said equivalent load point is located offset from the action point of the positive pressure force toward inflow end, and a distance between the equivalent load point and the action point of the positive pressure is larger than about 0.1 times as large as an overall slider length.

2. A magnetic disc apparatus as set forth in claim 1, wherein the action point of the positive pressure force is located offset from the action point of the negative pressure force toward the inflow end.

3. A magnetic disc apparatus comprising a magnetic disc having a surface and rotatably mounted on a spindle, a slider incorporating lifting rails or lifting pads opposed to the surface of the magnetic disc, for inducing a positive pressure, and a magnetic head provided to a lifting rail or a lifting pad on the outflow end side, for recording and reproducing data to and from said magnetic disc, a suspension supporting the slider, for applying a predetermined urging force to the slider, and a carriage attached to said suspension, for positioning said slider on the magnetic disc, said slider having an inverted stepped wall formed in a shape such that it is caved in a direction from the inflow end to the outflow end of the slider, and a bleed surface formed at the outerflow end side of the inverted stepped wall and caved from the lifting rails or the lifting pads, for producing a negative pressure force which is the resultant force of negative pressure applied upon an opposed surface of the slider with respect to the magnetic disc, an action point of an equivalent load which is a resultant force, perpendicular to the surface of the magnetic disc, between a force and a pitching moment exerted to the slider by the suspension, on the slider, which is an equivalent load point is located offset from the inverted stepped wall of said slider toward the inflow end of said slider, wherein said equivalent load point is located offset from a position which is taken from the inflow end to the outflow end of the slider by a distance which is about 0.3 times as large as the overall slider length, toward the inflow end thereof.

4. A magnetic disk apparatus comprising a magnetic disc having a surface and rotatably mounted on a spindle, a slider incorporating lifting rails or lifting pads opposed to the surface of the magnetic disc, for inducing a positive pressure, and a magnetic head provided to a lifting rail or a lifting pad on the outflow end side, for recording and reproducing data to and from said magnetic disc, a suspension supporting the slider, for applying a predetermined urging force to the slider, and a carriage attached to said suspension, for positioning said slider on the magnetic disc, said slider having an inverted stepped wall formed in a shape such that it is caved in a direction from the inflow end to the outflow end of the slider, and a bleed surface formed at the outerflow end side of the inverted stepped wall and caved from the lifting rails or the lifting pads, for producing a negative pressure force which is the resultant force of negative pressure applied upon an opposed surface of the slider with respect to the magnetic disc, an action point of an equivalent load which is a resultant force, perpendicular to the surface of the magnetic disc, between a force and a pitching moment exerted to the slider by the suspension, on the slider, which is an equivalent load point is located offset from the inverted stepped wall of said slider toward the inflow end of said slider, wherein said magnetic disc incorporates a data zone in which signals are recorded, and said slider has a load and unload mechanism for loading and unloading the slider to and from a load and unload zone provided in the vicinity of the outer peripheral edge of the magnetic disc, said slider is provided with an unload hook located between a position which is taken from the inflow end of the slider by a distance about 0.5 times as large as the overall slider length, and the outflow end thereof.

* * * * *